(12) United States Patent
Kimura et al.

(10) Patent No.: US 7,669,544 B2
(45) Date of Patent: Mar. 2, 2010

(54) DISPLAY APPARATUS

(75) Inventors: Hiromichi Kimura, Shimada (JP); Kouichi Takao, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/117,770

(22) Filed: May 9, 2008

(65) Prior Publication Data

US 2008/0282588 A1 Nov. 20, 2008

(30) Foreign Application Priority Data

May 16, 2007 (JP) ............................. 2007-130163

(51) Int. Cl.
*G01D 11/28* (2006.01)
*G01D 13/22* (2006.01)

(52) U.S. Cl. ................. 116/286; 116/284; 116/DIG. 36

(58) Field of Classification Search ............... 116/62.1, 116/62.4, 284, 286, 287, 288, 300, 301, 302, 116/305, DIG. 36; 362/23, 26, 27, 29, 30
See application file for complete search history.

(56) References Cited

U.S. PATENT DOCUMENTS 2,846,970 A * 8/1958 Dupree ................... 116/287
4,621,306 A * 11/1986 Sell ............................ 362/29
7,082,890 B2 * 8/2006 MacGregor et al. ......... 116/284

FOREIGN PATENT DOCUMENTS

| DE | 102008023623 A1 | * | 11/2008 |
| JP | 2004045214 A | * | 2/2004 |
| JP | 2004-69514 A | | 3/2004 |
| JP | 2004219210 A | * | 8/2004 |
| JP | 2006162569 A | * | 6/2006 |

* cited by examiner

Primary Examiner—R. Alexander Smith
(74) Attorney, Agent, or Firm—Sughrue Mion, PLLC

(57) ABSTRACT

To provide a display apparatus which is intended to improve the miniaturization and illumination efficiency, an indicator 8 is disposed on the rear surface side of a transparent display panel 3. A printed board 5 mounts a movement 7 on the front surface thereof so as not to overlap the movement 7 and the transparent display panel 3 and mounts the indicator 8 on the rear surface thereof. LEDs 6 for the transparent display panel are mounted on the front surface of the printed board 5 so as to oppose to the outer peripheral surface of the transparent display panel 3.

4 Claims, 4 Drawing Sheets

DISPLAY APPARATUS

BACKGROUND OF THE INVENTION

1. Field of the Invention

The present invention relates to a display apparatus and, in particular, relates to a display apparatus including a transparent display panel on which indexes are formed and an indicator which is disposed on the rear surface side of the transparent display panel and indicates the indexes.

2. Description of the Related Art

A display apparatus shown in FIG. 4, for example, is proposed as the aforesaid display apparatus (a patent document 1). As shown in the figure, a display apparatus 100 includes a transparent display panel 3, an indicator 8, a printed board 5, a movement 7 and an LED 6 for the transparent display panel serving as a light source.

The transparent display panel 3 is configured by a light guide member formed by translucent resin. The transparent display panel includes a display panel main body 32, which is arranged in a manner that indexes such as characters and graduations 31 are printed by white on the rear surface side thereof, and a guide portion 33 which is provided beneath the display panel main body 32 and protrudes toward the rear surface side.

The indicator 8 is disposed on the rear surface side of the display panel main body 32 and indicates the index. The printed board 5 is disposed on the rear surface side of the indicator 8. The movement 7 for rotating the indicator 8 is mounted on the rear surface of the printed board 5 and the LED 6 for the transparent display panel for illuminating the transparent display panel 3 is mounted on the front surface of the printed board. The LED 6 for the transparent display panel is provided on the printed board 5 in an opposite manner to the guide portion 33.

However, in the aforesaid configuration, it is required to provide the guide portion 33 at the transparent display panel 3 in order to illuminated the transparent display panel 3. To this end, since such a space shown by A is required, there arises a problem that the size of the display apparatus becomes large. Further, since light is guided to the display panel main body 32 via the guide portion 33, there arises a problem that the illumination efficiency is degraded.

Patent Document 1: JP-A-2004-69514

SUMMARY OF THE INVENTION

Accordingly, in view of the aforesaid problems, an object of the invention is to provide a display apparatus which can be miniaturized and improve the illumination efficiency.

The invention claimed in claim 1 made in order to solve the aforesaid problems is arranged in a manner that a display apparatus including:

a transparent display panel on which indexes are formed;

an indicator which is disposed on a rear surface side of the transparent display panel and indicates the index;

a movement which rotates the indicator;

a light source which illuminates the transparent display panel; and a board on which the movement and the light source are mounted, wherein the movement is mounted on a front surface side of the board, the indicator is mounted on a rear surface side of the board, and the light source is mounted on the front surface of the board so as to oppose to an outer peripheral surface of the transparent display panel.

According to the invention claimed in claim 1, the movement is mounted on the front surface side of the board and the indicator is mounted on the rear surface side of the board. Thus, the transparent display panel and the board can be provided to be close to each other and the light source can be mounted on the rear surface of the board so as to oppose to the outer peripheral surface of the transparent display panel. As a result, a light ray from the light source can be entered from the outer peripheral surface of the transparent display panel and conducted to the transparent display panel without providing a guide portion protruding to the rear surface side at the transparent display panel.

The invention claimed in claim 2 resides in the display apparatus claimed in claim 1 in a manner that the light source is mounted on the board in a manner that an optical axis of the light source is in parallel to the transparent display panel.

According to the invention claimed in claim 2, since the light source is mounted on the board in a manner that the optical axis of the light source is in parallel to the transparent display panel, the illumination efficiency can be further improved.

The invention claimed in claim 3 resides in the display apparatus claimed in claim 1 or 2 in a manner that the light source is disposed on the board so as to oppose to an outer peripheral surface on the movement side of the transparent display panel.

According to the invention claimed in claim 3, since the light source is disposed on the board so as to oppose to the outer peripheral surface on the movement side of the transparent display panel, the display apparatus can be further miniaturized.

The invention claimed in claim 4 resides in the display apparatus claimed in one of claim 1 to 3 in a manner that the indicator has a rear end portion to which the rotation shaft of the movement is attached, a tip end portion which is provided on the front surface side than the rear end portion and indicates the index, and a coupling portion for coupling the rear end portion and the tip end portion According to the invention claimed in claim 4, since the tip end portion of the indicator is disposed on the front surface side than the rear end portion thereof, the tip end portion of the indicator can be disposed so as to be close to the transparent display panel.

As explained above, according to the invention claimed in claim 1, since a light ray from the light source can be entered from the outer peripheral surface of the transparent display panel and conducted to the transparent display panel without providing a guide portion protruding to the rear surface side at the transparent display panel, the apparatus can be miniaturized and the illumination efficiency can be improved.

According to the invention claimed in claim 2, the illumination efficiency can be further improved.

According to the invention claimed in claim 3, the display apparatus can be further miniaturized.

According to the invention claimed in claim 4, since the tip end portion of the indicator can be disposed so as to be close to the transparent display panel, the visibility of the indicator can be enhanced.

DESCRIPTION OF THE PREFERRED EMBODIMENTS

Figure 1:
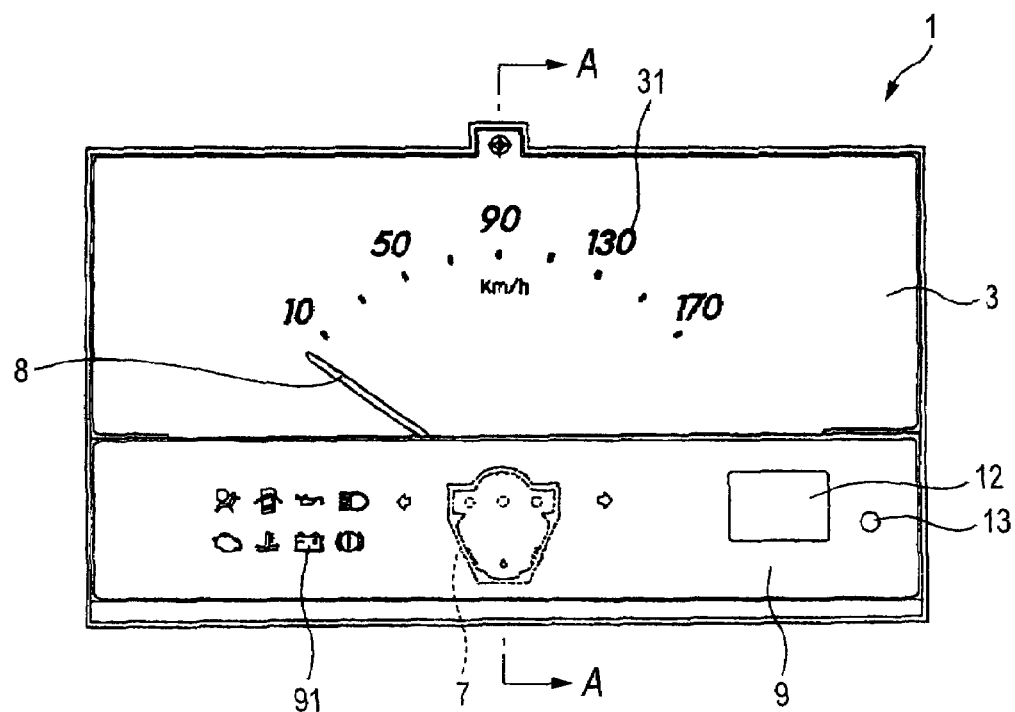
FIG. 1 is a front view showing an embodiment of the display apparatus according to the invention.

Hereinafter, an embodiment according to the invention will be explained below. The display apparatus according to the embodiment of the invention is used for a speed meter shown in FIG. 1.

The display apparatus 1 is an apparatus that is mounted on a movable body such as an automobile and displays a status of the movable body with respect to an occupant of the movable body. As shown in the figure, the display apparatus 1 includes a rear cover 2, a transparent display panel 3, a case 4, a printed board 5 serving as a board, LEDs 6 for the transparent display panel serving as light sources, a movement 7, an indicator 8 and a display panel 9.

Figure 2:
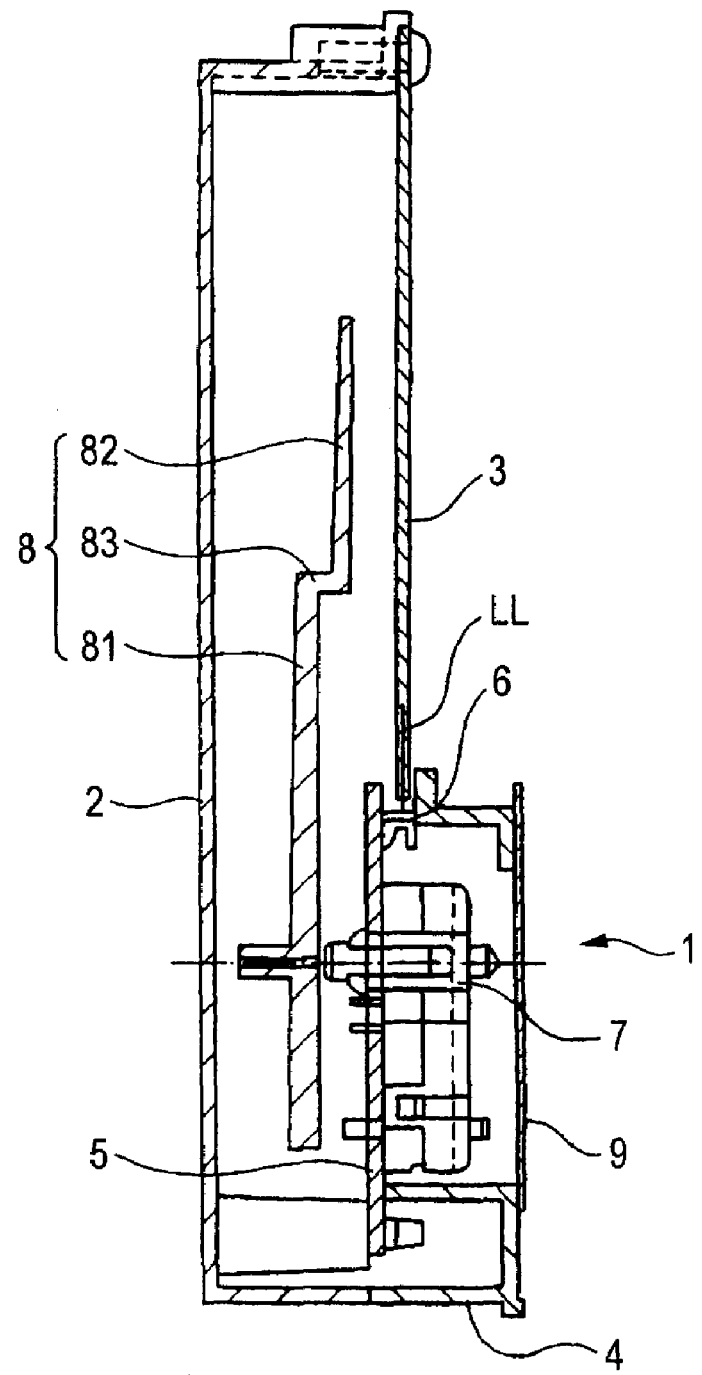
FIG. 2 is a sectional view cut along a line A-A in FIG. 1.
Figure 3:
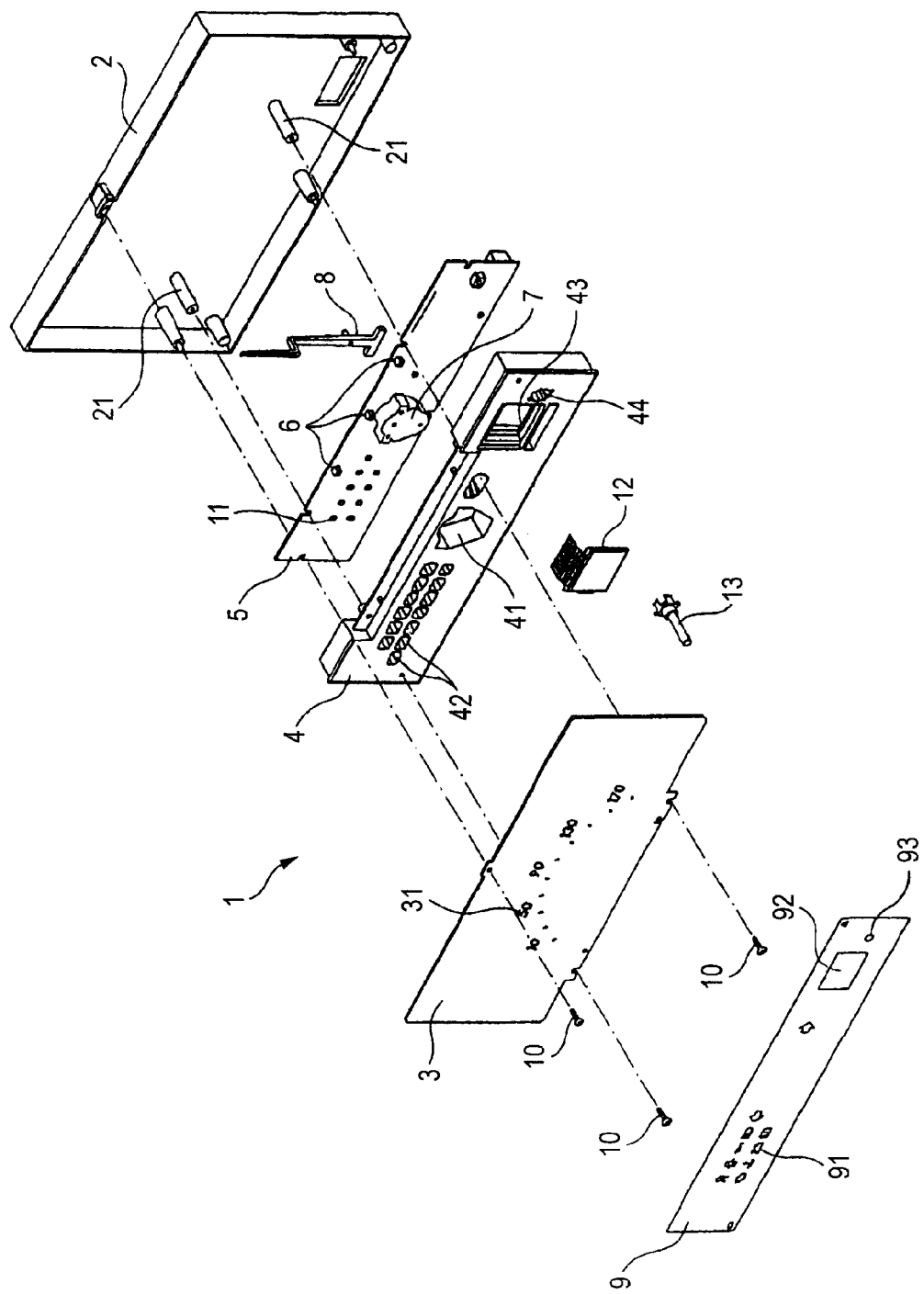
FIG. 3 is an exploded perspective view of the display apparatus shown in FIG. 1.
Figure 4:
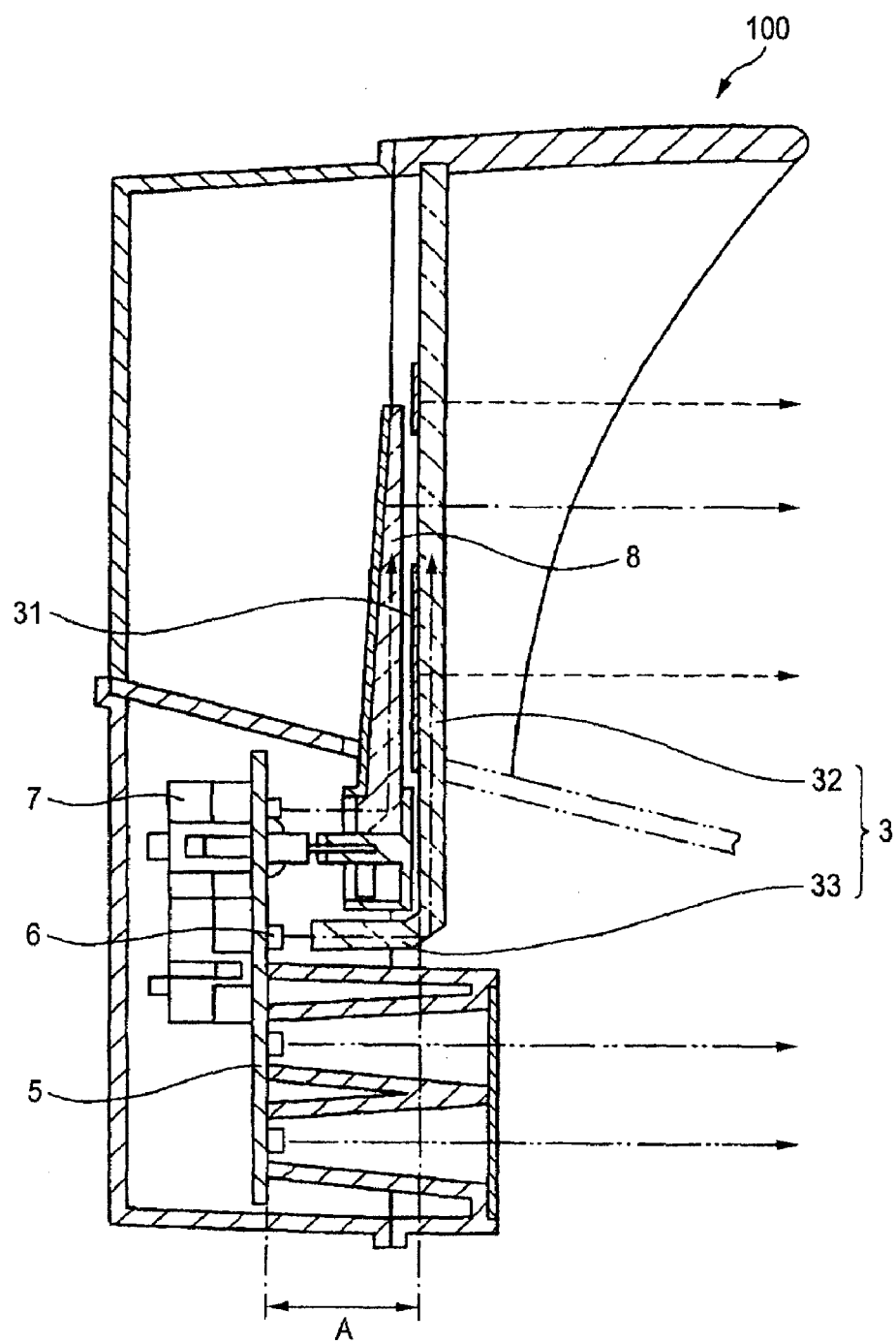
FIG. 4 is a sectional view showing an example of a display apparatus of a related art.

The rear cover 2 is formed in a saucer shape which is opened on the case 4 side. The rear cover 2 is provided with bosses 21 etc. for screwing the panel 3, the case 4 and the printed board 5 described later by screws 10. As shown in FIG. 2, the panel 3 is disposed above the rear cover 2. The panel 3 is configured almost in a rectangular shape and formed by light guide material etc. having translucency such as acrylic resin. The transparent display panel is provided with characters and graduations 31 corresponding to a vehicle speed. The characters and graduations 31 are printed by a color of white group on the rear surface of the transparent display panel 3, for example.

The case 4 is disposed beneath the rear cover 2 on the front surface side thereof. The case 4 houses therein the movement 7, warning display LEDs 11 for respectively illuminating warning designs 91, a liquid crystal display 12 and a trip knob 13 etc. as described later. The rear cover is provided with an movement opening portion 41 in which the movement 7 is disposed, illumination opening portions 42 in which the warning display LEDs 11 are respectively disposed, a liquid crystal opening portion 43 in which the liquid crystal display 12 is disposed and a knob opening potion 44 in which the trip knob 18 is disposed.

The case 4 further houses therein the printed board 5 of an almost rectangular shape serving as the board which is electrically connected to the movement 7, the warning display LEDs 11, the liquid crystal display 12, the trip knob 13 and the transparent display panel LEDs 6 serving as the light sources for illuminating the transparent display panel 3 etc. The printed board 5 is provided between the case 4 and the rear cover 2. Electronic parts etc. such as a microcomputer for controlling the operations of the movement 7 etc. are mounted on the printed board.

As shown in FIG. 2, the printed board 5 is disposed on the rear surface side than the transparent display panel 3 in a manner that the upper end of the printed board slightly overlaps with the lower end of the transparent display panel 3. The printed board 5 mounts the movement 7, the warning display LEDs 11 and the transparent display panel LEDs 6 etc. on the front surface side thereof and also mounts the indicator 8 on the rear surface side thereof.

The movement 7 is mounted on a portion of the printed board 5 not covered by the transparent display panel 3 so as not to be overlapped with the transparent display panel 3. The movement 7 is coupled to a not-shown vehicle speed measuring means mounted on a vehicle. The movement 7 has a rotary shaft which rotates in accordance with a measurement value measured by the vehicle speed measuring means. The movement 7 is provided in a manner that the rotary shaft protrudes from the rear surface side of the printed board 5.

The three transparent display panel LEDs 6 are disposed at the upper end portion of the printed board 5 along the longitudinal direction thereof so as to oppose to the outer peripheral surface on the movement 7 side of the transparent display panel 3. As shown in FIG. 2, the transparent display panel LEDs 6 are provided on the printed board 5 in a manner that the optical axes LL thereof are directed upward, that is, in parallel to the transparent display panel 3. The movement 7 is disposed just beneath the center one of the three transparent display panel LEDs 6.

The indicator 8 is formed by the light guide material etc. having translucency such as acrylic resin. The indicator 8 has a rear end portion 81 serving as a center shaft, a tip end portion 82 which is provided on the front surface side than the rear end portion 81 and indicates the character and graduation 31, and a coupling portion 83 for coupling the rear end portion 81 and the tip end portion 82. The indicator 8 is attached to the rotation shaft of the movement 7 at the shaft 81. The indicator 8 rotates integrally with the rotation shaft of the movement 7. The indicator 8 is rotated by the movement 7 in accordance with the measurement value measured by the vehicle speed measuring means to indicate the measurement value together with the characters and graduations 31.

The display panel 9 is provided on the front surface side of the case 4 so that the movement 7 etc. are not exposed on the front surface. The display panel 9 is provided with a plurality of the warning designs 91, a liquid crystal opening portion 92 in which the liquid crystal display 12 is disposed and a knob opening portion 93 in which the trip knob 13 is disposed. The warning designs 91 are provided in front of the warning display LEDs 11 and are illuminated when the LEDs are lightened, respectively.

According to the aforesaid display apparatus 1, when the transparent display panel LEDs 6 are lightened, the light rays from the transparent display panel LEDs 6 are entered from the outer peripheral surface of the transparent display panel 3 to illuminate the transparent display panel 3.

According to the aforesaid display apparatus 1, the movement 7 is mounted on the front surface side of the printed board 5 and the indicator 8 is mounted on the rear surface side of the printed board 5. Thus, since the transparent display panel 3 and the printed board 5 can be provided so as to be close to each other, the transparent display panel LEDs 6 can be disposed on the printed board 5 so as to oppose to the outer peripheral surface of the transparent display panel 3. As a result, since the light rays from the transparent display panel LEDs 6 can be entered from the outer peripheral surface of the transparent display panel 3 and conducted to the transparent display panel 3 without providing a guide portion protruding to the rear surface side at the transparent display panel 3, the display apparatus can be miniaturized. Further, since the transparent display panel 3 can be illuminated without passing through the guide portion, the illumination efficiency can be improved.

Further, according to the aforesaid display apparatus 1, since the transparent display panel LEDs 6 are provided on the printed board 5 in a manner that the optical axes LL thereof are in parallel to the transparent display panel 3, the illumination efficiency can be further improved.

Further, according to the aforesaid display apparatus 1, since the transparent display panel LEDs 6 are disposed on the board so as to oppose to the outer peripheral surface on the movement 7 side of the transparent display panel 3, the display apparatus can be further miniaturized.

Furthermore, according to the aforesaid display apparatus 1, since the indicator 8 has the rear end portion 81 to which the rotation shaft of the movement 7 is attached, the tip end portion 82 which is provided on the front surface side than the rear end portion 81 and indicates the index, and the coupling portion 83 for coupling the rear end portion 81 and the tip end portion 82, and further since the tip end portion 82 of the indicator 8 is provided on the front surface side than the rear end portion 81, the tip end portion 82 of the indicator 8 can be disposed so as to be close to the transparent display panel 3, whereby the visibility of the indicator 8 can be improved.

In the aforesaid embodiment, although the transparent display panel LEDs 6 are provided on the printed board 5 in a manner that the optical axes LL of the transparent display panel LEDs 6 are in parallel to the transparent display panel 3, the invention is not limited thereto. Although the aforesaid embodiment is optimum, the axes LL may not be in parallel to the transparent display panel 3.

Further, in the aforesaid embodiment, although the transparent display panel LEDs 6 are provided so as to oppose to the outer peripheral surface on the movement 7 side of the transparent display panel 3, the invention is not limited thereto. Although the aforesaid embodiment is optimum for the miniaturization, the display apparatus can be miniaturized in the front and rear directions even if the transparent display panel LEDs 6 are not provided on the movement 7 side so long as the these LEDs are provided so as to oppose to the outer peripheral surface of the transparent display panel 3.

Furthermore, in the aforesaid embodiment, although the indicator 8 is configured by the rear end portion 81, the tip end portion 82 and the coupling portion 83, the invention is not limited thereto. For example, the indicator may be configured so as not to be provided with a step portion between the rear end portion 81 and the coupling portion 83.

The aforesaid embodiment merely shows a typical example of the invention and the invention is not limited to the embodiment. That is, the invention can be implemented in various manners without departing from the gist of the invention.

What is claimed is:

1. A display apparatus, comprising:
   a transparent display panel, on which indexes are formed;
   an indicator, disposed on a rear surface side of the transparent display panel and indicates the index;
   a movement, rotating the indicator;
   a light source, illuminating the transparent display panel; and
   a board, on which the movement and the light source are mounted,
   wherein the movement is mounted on a front surface side of the board;
   the indicator is mounted to the movement and disposed on a rear surface side of the board; and
   the light source is mounted on the front surface of the board so as to oppose an outer peripheral surface of the transparent display panel.

2. The display apparatus according to claim 1, wherein the light source is mounted on the board in a manner that an optical axis of the light source is in parallel to the transparent display panel.

3. The display apparatus according to claim 1, wherein the light source is disposed on the board so as to oppose the outer peripheral surface of the transparent display panel on the movement side of the transparent display panel.

4. The display apparatus according to claim 1, wherein the indicator has a rear end portion to which a rotation shaft of the movement is attached, a tip end portion which is provided on the front surface side than the rear end portion and indicates the index, and a coupling portion for coupling the rear end portion and the tip end portion.

* * * * *